United States Patent [19]

Osaki et al.

[11] Patent Number: 5,280,598
[45] Date of Patent: Jan. 18, 1994

[54] CACHE MEMORY AND BUS WIDTH CONTROL CIRCUIT FOR SELECTIVELY COUPLING PERIPHERAL DEVICES

[75] Inventors: Akitoshi Osaki; Koichi Nishida, both of Itami, Japan

[73] Assignee: Mitsubishi Denki Kabushiki Kaisha, Japan

[21] Appl. No.: 717,779

[22] Filed: Jun. 17, 1991

[30] Foreign Application Priority Data

Jul. 26, 1990 [JP] Japan .................................. 2-199793

[51] Int. Cl.$^5$ ...................... G06F 12/08; G06F 12/04
[52] U.S. Cl. .............................. 395/425; 364/DIG. 1
[58] Field of Search ...................................... 395/425; 364/200MS, 900MS

[56] References Cited

U.S. PATENT DOCUMENTS

| | | | |
|---|---|---|---|
| 4,371,928 | 2/1983 | Barlow et al. | 395/425 |
| 4,447,878 | 5/1984 | Kinnie et al. | 395/325 |
| 4,467,413 | 8/1984 | Dshkhunian et al. | 395/325 |
| 4,514,808 | 4/1985 | Murayama et al. | 395/425 |
| 4,590,556 | 5/1986 | Berger et al. | 395/700 |
| 4,683,534 | 7/1987 | Tietjen et al. | 395/325 |
| 4,845,611 | 7/1989 | Turlakov et al. | 395/250 |
| 5,003,463 | 3/1991 | Coyle et al. | 395/275 |
| 5,014,186 | 5/1991 | Chisholm | 395/275 |
| 5,113,369 | 5/1992 | Kinoshita | 395/325 |
| 5,148,539 | 9/1992 | Enomoto et al. | 395/425 |

OTHER PUBLICATIONS

MC88200 Cache/Memory Management Unit User's Manuel/Motorola (pp. 4-1 to 4-5 and 5-2 to 5-3).

Primary Examiner—Joseph L. Dixon
Assistant Examiner—Matthew Kim
Attorney, Agent, or Firm—Townsend and Townsend

[57] ABSTRACT

A bus width control circuit being arranged between a first bus and a second bus both of n-bits width, and comprising a buffer group being connected to the first bus and which split data of n-bits into partial data of m-bits and buffer them, a selector which connects each buffer to the second bus in parallel in the case where the effective data bus width of the second bus is n bits and which connects each buffer to a predetermined m bits of the second bus in the case where the effective data bus width of the second bus is m bits, and a control circuits thereof, and a control circuit which locates intact the n-bits data of the first bus in the second bus or by splitting it into partial data of m-bits in a predetermined portion of n-bits data and outputs them sequentially to the second bus, or which splits the n-bits data of the second bus into partial data of m-bits and buffers them in each buffer and then simultaneously outputs them to the first bus, or which sequentially buffers data whose m bits alone of the second bus is effective into each buffer and then simultaneously outputs them to the first bus.

4 Claims, 11 Drawing Sheets

Fig. 11

| CYCLE | n | n+1 | n+2 | n+3 |
|---|---|---|---|---|
| MPU BUS | WRITE | READ (HIT) | READ (HIT) | READ (HIT) |
| SYSTEM BUS | WRITING OF EFFECTIVE BYTE EB1 | WRITING OF EFFECTIVE BYTE EB2 | WRITING OF EFFECTIVE BYTE EB3 | WRITING OF EFFECTIVE BYTE EB4 |

CACHE MEMORY AND BUS WIDTH CONTROL CIRCUIT FOR SELECTIVELY COUPLING PERIPHERAL DEVICES

BACKGROUND OF THE INVENTION

1. Field of the Invention

The present invention relates to a bus width control circuit and a cache memory comprising the same, which are used for enabling connection effectively and readily to various kinds of peripheral devices, in a data processor including an MPU (microprocessing unit) being connected to a system bus by means of a cache memory, for example, by enabling to use the system bus with a smaller data bus width than that of the MPU.

2. Description of the Related Art

In the data processor, access time from an MPU to a main memory tends to be shortened owing to both the improvement of the operational frequency of the MPU and various kinds of inventions. However, access time for a memory element which has high degree of integration mainly used for the main memory and the like is not so shortened, which becoming an obstacle in a tendency to allow the access operation from the MPU to the main memory to be executed at higher speed. In order to avoid such an obstacle, it is advantageous to employ a cache memory which consists of memory elements whose degree of integration is not so high but which are capable of being operated at high speed and are accessed in a shorter time. In other words, by holding a portion of the storage content of the main memory in the cache memory and supplying the content being stored in this cache memory into the MPU, the number of times for directly accessing the main memory is reduced, which enabling to substantially shorten the access time from the MPU to the main memory. This is used because a local access from the MPU to the main memory tends to be repeated many times.

FIG. 1 is a block diagram illustrating by way of example construction of a data processor wherein such a conventional cache memory as described above is installed.

In FIG. 1, reference numeral 21 designates an MPU and reference numeral 6 designates a system bus, and a cache memory 1 is provided between the both. The cache memory 1 is connected to the MPU 21 by means of an MPU bus 5. The system bus 6 is connected to various kinds of peripheral devices 41 . . . 4n including a main memory, and address spaces for the MPU 21 are allocated in the respective peripheral devices 41 . . . 4n.

Now will be described operation in read access by the MPU 21 in a specified address in the above described conventional construction of the data processor.

The read access by the MPU 21 is that the MPU 21 outputs an address being allocated in the peripheral devices 41 . . . 4n and reads the data being stored in the address of the peripheral device 41 . . . 4n. Tn the case where said data is not stored in the cache memory 1 yet (hereinafter referred to as cache miss) in the read access by the MPU 21, the cache memory 1 accesses to read said data for the peripheral devices 41 . . . 4n via the system bus 6 and fetches said data, inputting this to the MPU 21 via the MPU bus 5. In that case, in the case where the data being accessed to read is the data being in an address area subject to be cached (holding in cache memory), the cache memory 1 holds the data and its address therein.

On the other hand, in the case where said data is stored in the cache memory 1 (hereinafter referred to as cache hit) in the read access by the MPU 21, the cache memory 1 directly inputs its holding data corresponding to the address being outputted by the MPU 21 to the MPU 21 via the MPU bus 5. In that case, the cache memory 1 does not access to read said data for the peripheral devices 41 . . . 4n.

Next will be described operation in write access by the MPU 21 in a specified address.

The write access by the MPU 21 is that the MPU 21 outputs both an address being allocated in the peripheral devices 41 . . . 4n and the data to be stored in the address and then the MPU 21 writes the data in the address of the peripheral devices 41 . . . 4n. When the MPU 21 accesses to write data, the cache memory 1 outputs both said data and its address to the system bus 6 and accesses to write the data for the peripheral devices 41 . . . 4n. At the same time, in the case where the address of said data is held in the cache memory 1, the cache memory 1 updates its corresponding data.

Incidentally, in the above construction, there are cases where there is a problem of the bus widths of the MPU bus 5 and system bus 6. The MPU bus 5 is used for data transfer between the cache memory 1 and the MPU 21, and the system bits 6 is used for data transfer between the cache memory 1 and various kinds of peripheral devices, respectively.

Efficiency in the data transfer is improved by allowing the data bus width of the cache memory 1 being at a side of the MPU 21 to be coincident with the data bus width of the MPU 21, then, the width of the MPU bus 5 is arranged to be the same as the above bus width. And the width of the system bus 6 is the same as the data bus width of the cache memory 1 being at a side of the system bus 6. In the conventional cache memory 1, the bus width at the side of the system bus 6 is arranged to be the same as the bus width at the side of the MPU 21.

For example, in MC88200 manufactured by Motorola Company, both a P-bus being a data bus at the side of MPU 21 and an M-bus being a data bus at the side of the system bus 6 are arranged to be fixed at 32-bits width (See "MC88200 User's Manual").

As mentioned above, enlargement of the data bus width accompanied by the tendency to improve the performance of the MPU enlarges the width of the system bus. However, there are cases where it is not necessary to have not so wide bus width for such a peripheral device as the main memory.

FIG. 2 is a block diagram illustrating construction of a data processor comprising an MPU 21, a cache memory 1, a main memory 31 with the same bus width as that of the MPU 21, a submemory 34 with a different bus width from that of the MPU 21, and the like.

In the submemory 34, there is stored a program which needs not so much memory storage, such as an initial program loader (IPL). In such a small-storage memory as the submemory 34, there is not employed a method to have the width of N bits by arranging a plurality (N pieces, for example) pieces of memory element of 1-bit width (M bits in depth) as shown in FIG. 3, but there is generally employed a method to have a simple memory element which has its own bits-width to such a degree as shown in FIG. 4, i.e., N (×M) bits, for example.

As compared with the enlargement of the data bus width of the MPU 21, the data bus width of such a memory element as shown in FIG. 4 is not so enlarged, then, it becomes difficult to make the data bus width coincident with the bus width of the MPU 21. In that case, there is generated a need to provide such a bus width control circuit designated by reference numeral 14 in FIG. 2 between the submemory 34 and the system bus 6.

FIG. 5 is a block diagram illustrating a data processor comprising a shared memory 33 instead of the submemory 34 being provided in the above construction shown in FIG. 2, an MPU 22 with a different bus width from that of the MPU 21, a main memory 32 for this MPU 22, and a system bus 60 being connected to the MPU 22, main memory 32, and shared memory 33, in addition to those elements being comprised in the construction shown in FIG. 2.

The construction shown in FIG. 5 is an example for improving the capability of processing in the whole unit by further connecting the MPU 21 with an enlarged data bus width to an existing data processor.

In the construction shown in FIG. 5, the data bus widths of both the main memories 31, 32 are coincident with the respective data bus widths of the MPUs 21, 22. Then, in order to enable the access from the both MPUs 21, 22 to the shared memory 33, there is generated a need to provide the bus width control circuit 14 between the shared memory 33 and the system bus 6.

As mentioned above, in the conventional data processors shown in FIGS. 2 and 5, since the data bus width of the cache memory 1 being at a side of the system bus 6 is fixed to the data bus width of the MPU 21, there is a need to provide the bus width control circuit 14 to convert the data bus width. Specifically in the case where such a submemory 34 as shown in FIG. 2 is additionally provided in the construction shown in FIG. 5, there is generated another problem that it is necessary to provide the bus width control circuit 14 in both the shared memory 33 and in the submemory 34, respectively.

SUMMARY OF THE INVENTION

The foregoing inconveniences are overcome in accordance with the present invention, and the primary object of the invention is to provide a bus width control circuit and a cache memory comprising the same, which is effectively and readily connected to various kinds of peripheral devices with smaller bus widths than that of an MPU by enabling to change the effective bus width of the cache memory being at a side of a system bus, for example, in a data processor.

The bus width control circuit of the invention is arranged between two buses of n-bits, and is provided with a buffer group each of which splits n-bits data into partial data of m bits and buffers them in the first bus, a selector which connects each buffer to the second bus in parallel in the case where the effective data bus width of the second bus is n bits and which connects each buffer to a predetermined m bits of the second bus in the case where the effective data bus width of the second bus is m bits and control means of the selector, and means for storing n-bits data of the first bus as it is in the second bus or by splitting it into partial data of m bits in a predetermined portion of n-bits data in the second bus and outputting them sequentially to the second bus, of splitting the n-bits data of the second bus into partial data of m bits and buffering them in each buffer and then outputting them simultaneously to the first bus, or buffering only the effective m-bits data of the second bus sequentially in each buffer and then outputting each of them simultaneously to the first bus.

In the bus width control circuit of the invention, in the case where the effective data bus width of the second bus is m bits, that is narrower than n bits of the first bus, after the n-bits data of the first bus is split into partial data of m bits and these are buffered in each buffer for a while, each of them is sequentially outputted to the second bus as the n-bits data being included in a predetermined m bits in n bits of the second bus. And the effective m-bits data in n bits of the second bus is outputted to the first bus as the data whose all n bits are effective after each effective m bits of the plural data is sequentially buffered in each buffer.

The cache memory of the present invention is provided with the above-mentioned bus width control circuit, thereby reducing a stand-by time of the MPU side when the MPU accesses to write data in the case where the bus width of the peripheral devices is narrower than that being at the side of the MPU.

The above and further objects and features of the invention will more fully be apparent from the following detailed description with accompanying drawings.

BRIEF DESCRIPTION OF THE DRAWINGS

FIG. 11 is a schematic view illustrating relationship between the operational state and operation cycle of the cache memory wherein the bus width control circuit of the invention is installed.

DESCRIPTION OF THE PREFERRED EMBODIMENTS

Now will be referred to preferred embodiments of the invention in detail with reference to the accompanying drawings.

Figure 1:
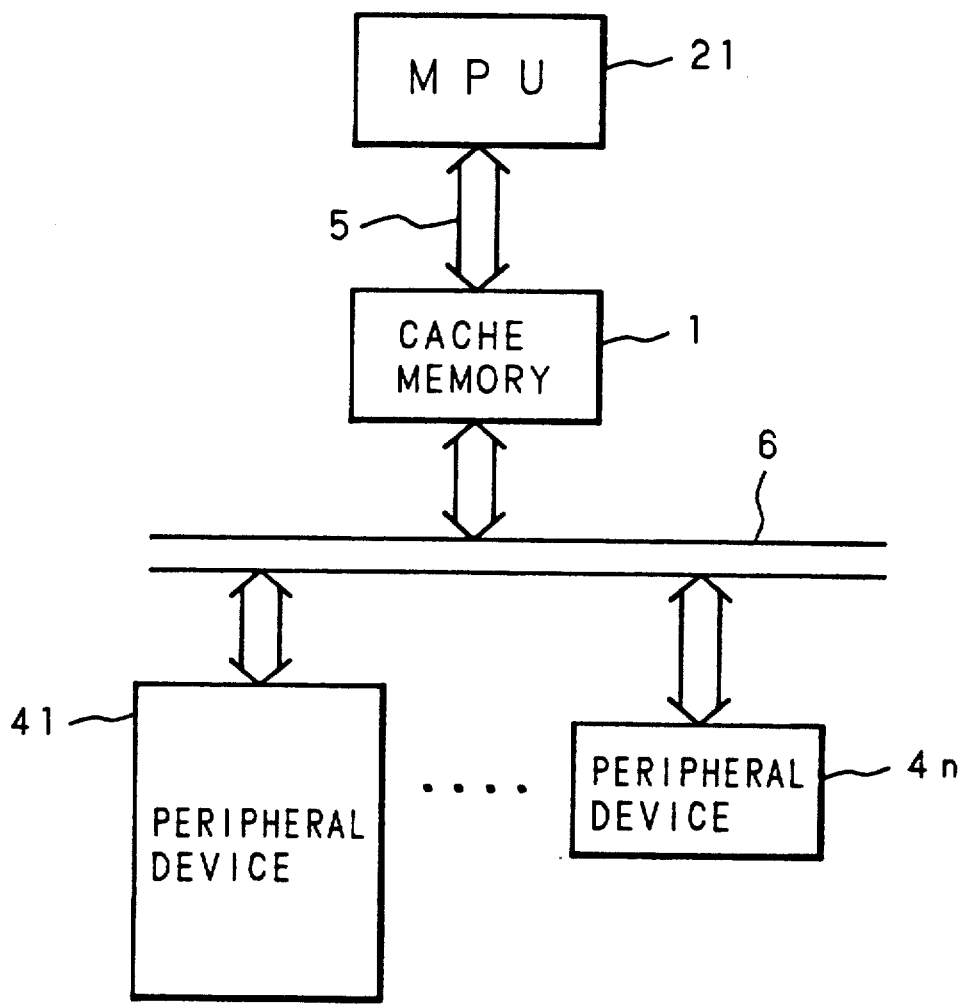
FIG. 1 is a block diagram illustrating an example of construction of a data processor wherein the conventional cache memory is installed.
Figure 2:
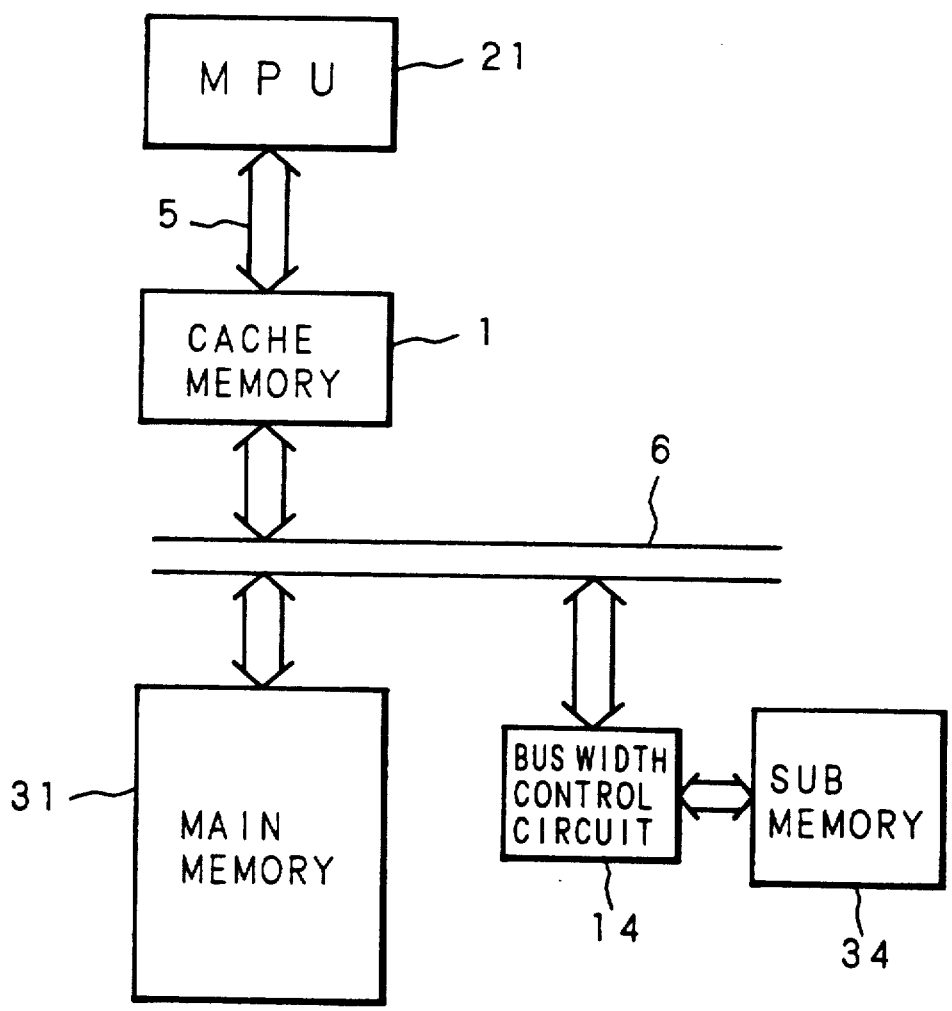
FIG. 2 is a block diagram illustrating a construction of a data processor to which is connected a peripheral device with a different bus width from that of an MPU.
Figure 3:
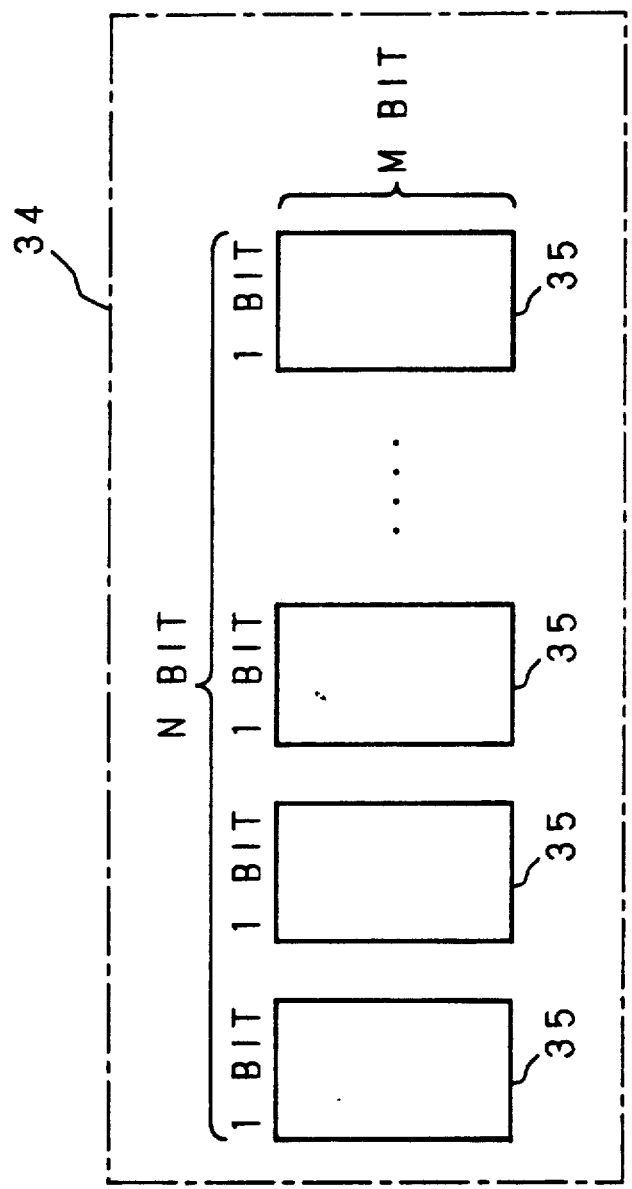
FIG. 3 is a schematic view illustrating an example of construction of a small-storage memory as a peripheral device of a data processor.
Figure 4:
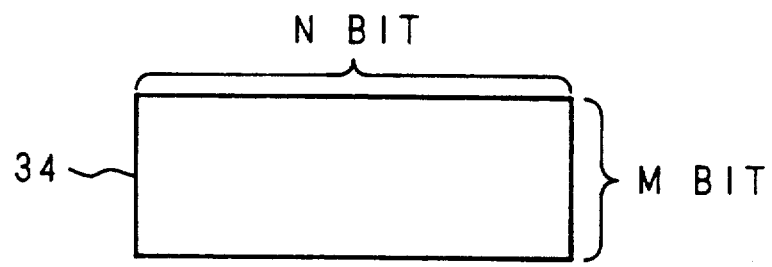
FIG. 4 is a schematic view illustrating another example of construction of the small-storage memory as the peripheral device of the data processor.
Figure 5:
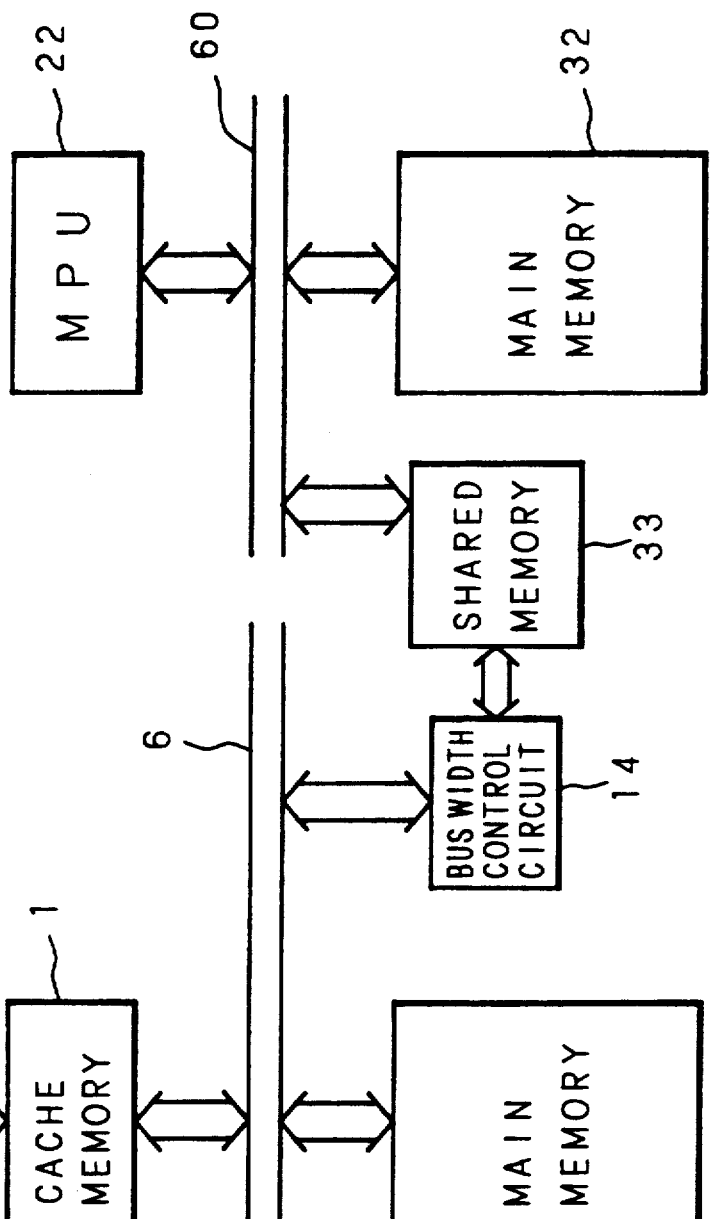
FIG. 5 is a block diagram illustrating a construction of the conventional data processor wherein an MPU with a different bus width is installed in the above-mentioned data processor shown, in FIG. 2.
Figure 6:
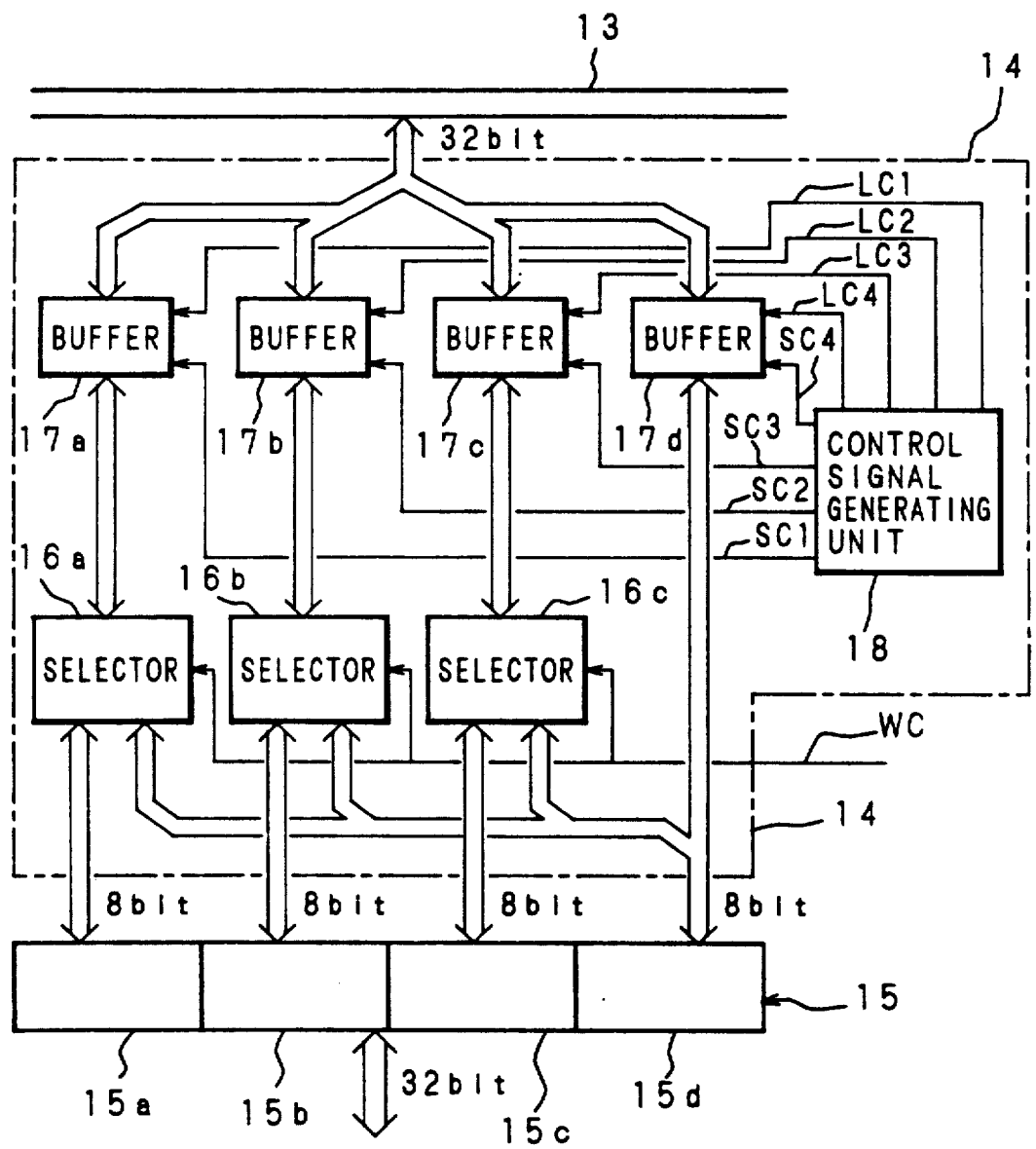
FIG. 6 is a block diagram illustrating a construction of a bus width control circuit in accordance with present invention.

FIG. 6 is a block diagram illustrating one example of construction of a bus width control circuit in accordance with the present invention. And FIG. 7 is a block diagram illustrating one example of construction of a data processor comprising a cache memory of the invention wherein the bus width control circuit in accordance with the invention shown in FIG. 6 is installed.

Figure 7:
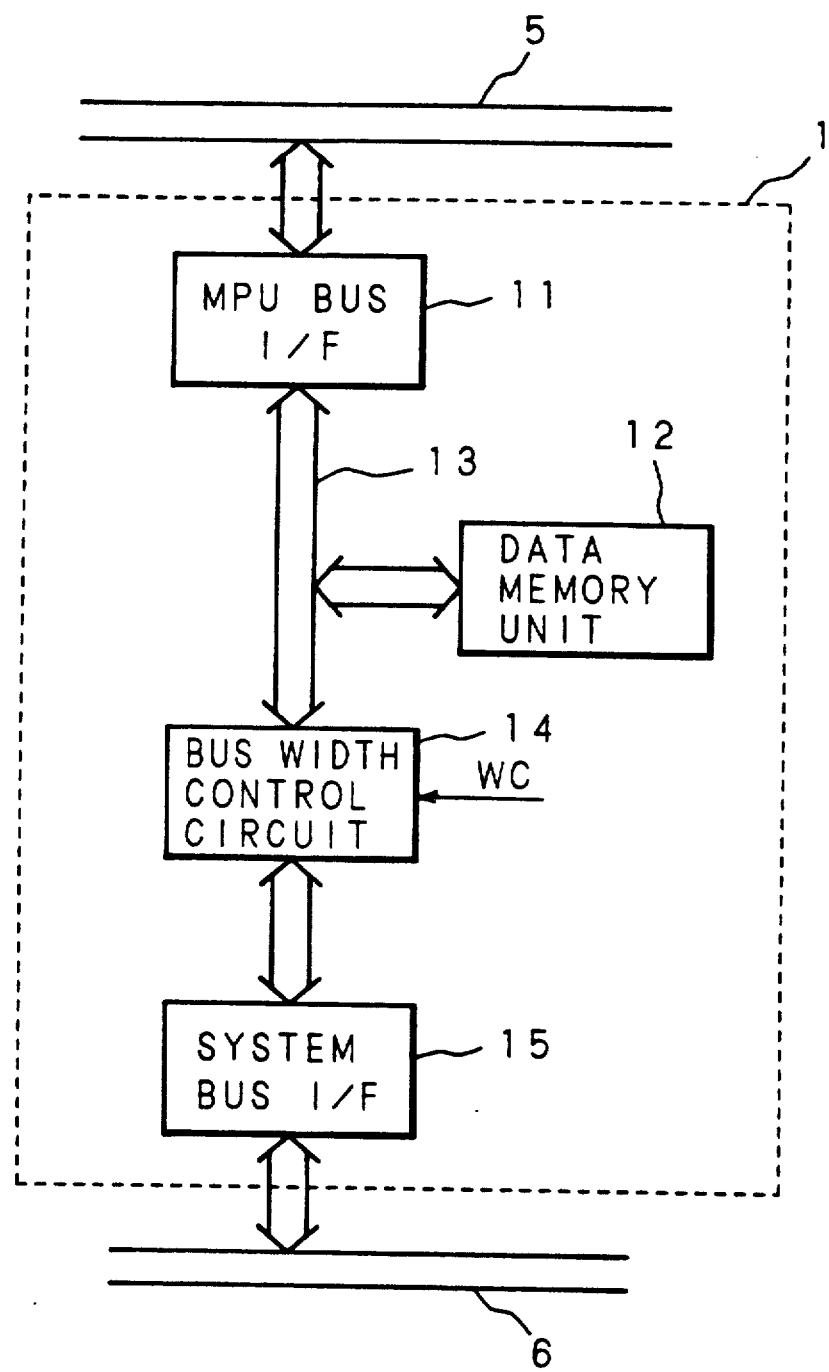
FIG. 7 is a block diagram illustrating a construction of a data processor comprising a cache memory of the invention wherein the bus width control circuit in accordance with the present invention is installed.

In FIG. 7, reference numeral 1 designates the cache memory of the present invention, which is connected to a peripheral device (not shown), such as a main memory, by means of a system bus 6 and to an MPU (not shown) by means of an MPU bus 5, respectively.

The cache memory 1 consists of a system bus interface (I/F) 15 being connected to the system bus 6, an MPU bus interface (I/F) 11 being connected to the MPU bus 5, a bus width control circuit 14 of the invention being arranged between the both interfaces 11 and 15, an internal data bus 13 for connecting the MPU bus interface 11 to the bus width control circuit 14, a data memory 12 being connected to the internal data bus 13, and control circuits (not shown) required for executing caching operation.

The effective bus width of the system bus 6 is controlled in response to a bus width control signal WC which is given from the external to the bus width control circuit 14. The bus width control signal WC can be fixed in the cache memory 1, however, in general this signal is given from the outside of the cache memory 1 and is capable of controlling a dynamic change of the bus width of the system bus 6. In the embodiment of the invention, for the sake of convenience of explanation, it is assumed that the bus width of the MPU bus 5 is fixed at 32 bits (4 bytes) and the effective bus width of the system bus 6 is variable at either 32 bits (4 bytes) or 8 bits (1 byte).

The bus width control circuit 14 consists of three selectors 16a, 16b, 16c, four buffers 17a, 17b, 17c, 17d, a control signal generating unit 18, and the like.

The selectors 16a, 16b, 16c are connected to the system bus interface 15, and the buffers 17a, 17b, 17c, 17d are connected to the internal data bus 13, respectively. And there are connected the selector 16a to the buffer 17a, the selector 16b to the buffer 17b, the selector 16c to the buffer 17c, respectively, and the buffer 17d is directly connected to the system bus interface 15.

The system bus interface 15 being four bytes (32 bits) in width is divided into four areas (15a through 15d) each being one byte (8 bit). And each one byte area 15a, 15b, 15c, 15d of the system bus interface 15 in order from the high-order side is connected to each selector 16a, 16b, 16c, and the buffer 17d, enabling the data transfers between each other. Furthermore, each selector 16a, 16b, 16c is also connected to one-byte area 15d being at the lowest-order side of the system bus interface 15.

The bus width control signal WC is given to each selector 16a, 16b, 16c. And this bus width control signal WC controls the state of connection between each selector 16a, 16b, 16c and the system bus interface 15. In other words, as mentioned above, each selector 16a, 16b, 16c is connected to their corresponding each one-byte area 15a, 15b, 15c of the system bus interface 15 as well as is connected to one-byte area 15d being at the lowest-order side of the system bus interface 15.

Accordingly, the bus width control signal WC controls either to connect each of the selectors 16a, 16b, 16c to its corresponding each area 15a, 15b, 15c of the system bus interface 15 or to connect all the selectors 16a, 16b, 16c to one-byte area 15d being at the lowest-order side of the system bus interface 15. In other words, the bus width control signal WC controls either to connect each buffer 17a, 17b, 17c, 17d to each area 15a, 15b, 15c, 15d of the system bus interface 15 or to connect all the buffers 17a, 17b, 17c, 17d to one-byte area 15d being at the lowest-order side of the system bus interface 15.

Each buffer 1-(a, 17b, 17c buffers each one-byte data given from each selector 16a, 16b, 16c as mentioned above, and the buffer 17d buffers data of the one-byte area 15d being at the lowest-order side of the system bus interface 15. And each buffer 17a, 17b, 17c, 17d buffers one byte of the four-byte data being on the internal data bus 13 after another in order from the highest-order side thereof. Furthermore, each buffer 17a, 17b, 17c, 17d connects each one-byte data being buffered by each of them in such an order from the highest-order side as the buffer 17a, 17b, 17c, 17d to make four-byte data, outputting this to the internal data bus 13. And each buffer 17a, 17b, 17c, 17d outputs each one-byte data being buffered by each of them to each of the selectors 16a, 16b, 16c and to the one-byte area 15d being at the lowest-order side of the system bus interface 15.

Controls in inputting and outputting data in each buffer 17a, 17b, 17c, 17d are executed in response to both sending control signals SC1 through SC4 and latch signals LC1 through LC4 which are given from the control signal generating unit 18 to the buffers 17a, 17b, 17c, 17d, respectively.

Now will be described below operation of the bus width control circuit of the present invention as constructed above.

Data connection Operation

Here, data connection means the operation for connecting four pieces of one-byte data with each other to make one piece of four-byte data.

Now will be referred to the case where the bus width control signal WC assigns one byte (8 bits) as the effective bus width of the system bus 6, that is, in the case where the data bus width of such a peripheral device as the main memory being connected to the system bus 6, for example, is one byte.

Figure 8:
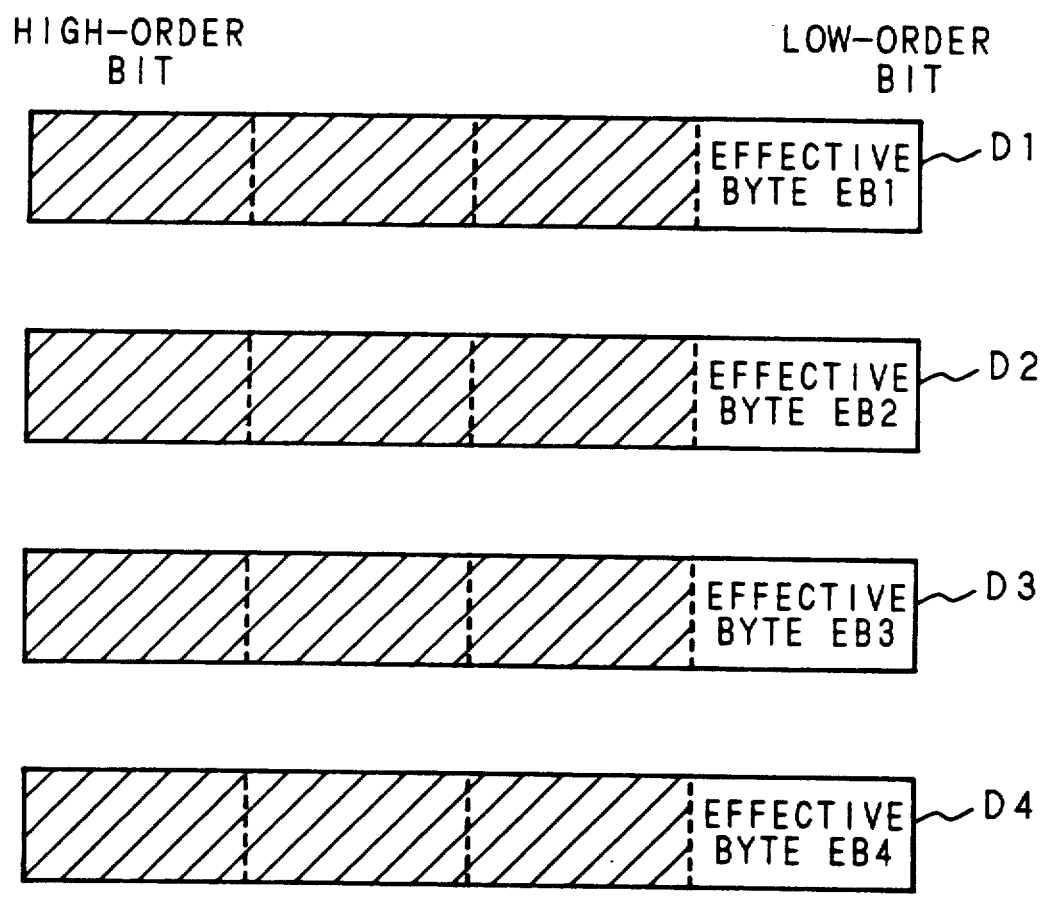
FIG. 8 is a schematic view illustrating bit images in the case where there exists data including one effective byte on a bus of four-bytes width.

In the case where the effective bus width of the system bus 6 is one byte, only one byte at the lowest-order side of the bus width of each of the four-byte (32 bits) data of the data being on the system bus 6 becomes such an effective bit image as designated by each reference characters D1 through D4 in FIG. 8, and then, each of the hatched portions becomes invalid whatever data is contained therein. In other words, each of effective bytes EB1 through EB4 are included in the only one byte at the lowest-order side of each of the four-byte data D1 through D4.

And when the bus width control signal WC assigns one byte as the effective bus width of the system bus 6, each selector 16a, 16b, 16c is controlled to connect each buffer 17a, 17b, 17c to the area 15d being at the lowest-order side of the system bus interface 15.

Four-byte data D1 is inputted from the system bus 6 to the system bus interface 15 first. At that time, one effective byte EB1 of the four-byte data D1 is inputted in the area 15d of the system bus interface 15, and invalid portions of the other three bytes are inputted in the area 15a, 15b, 15c. And the effective byte EB1 is sent from the area 15d of the system bus interface 15 via the selectors 16a, 16b, 16c to the buffers 17a, 17b, 17c, or is sent directly to the buffer 17d. At that point, however, the control signal generating unit 18 makes the latch signal LC1 alone significant and allows the buffer 17a to buffer the effective byte EB1 of the four-byte data D1.

And at the point when the four-byte data D2 is inputted to the system bus interface 15 and its effective byte EB2 is outputted via each selector 16a, 16b, 16c or directly to each buffer 17a, 17b, 17c, 17d, the control signal generating unit 18 makes the latch signal LC2 alone significant and the effective byte EB2 of the four-byte data D2 is buffered by the buffer 17b.

Figure 9:
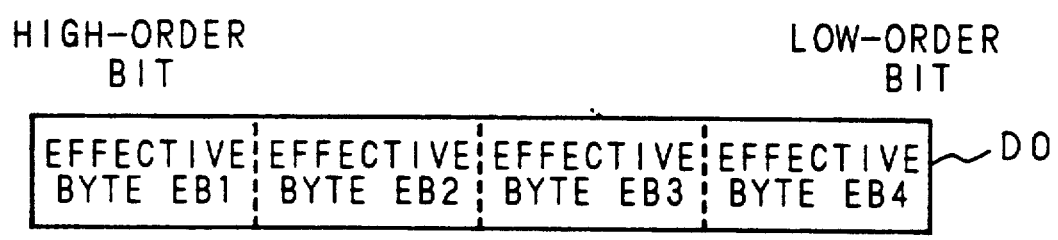
FIG. 9 is a schematic view illustrating a bit image in the case where four-byte data is constructed by connecting four pieces of one effective byte.

As in the same way, when the control signal generating unit 18 makes the latch signal LC3 alone significant, the effective byte EB3 of the four-byte data D3 is buffered by the buffer 17c, and when the control signal generating unit 18 makes the latch signal LC4 alone significant, the effective byte EB4 of the four-byte data D4 is buffered by the buffer 17d, respectively. And by controlling the sending control signal SC1 through SC4 given from the control signal generating unit 18 to each buffer 17a, 17b, 17c, 17d to be at the side of the internal data bus 13, the effective bytes EB1 through EB4 being buffered by the buffers 17a, 17b, 17c, 17d, respectively are outputted in parallel to the internal data bus 13, and such a four-byte data D0 as shown in FIG. 9 is outputted to the internal data bus 13.

Figure 10:
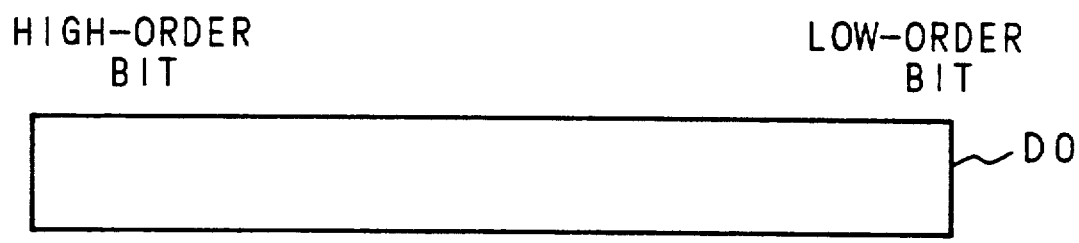
FIG. 10 is a schematic view illustrating a bit image of four-byte data including four effective bytes.

Incidentally, in the case where the bus width control signal WC sets the effective data bus width of the system bus 6 at, four bytes, the four-byte data being inputted from the system bus 6 to the system bus interface 15 becomes as shown in FIG. 10. In that case, each selector 16a, 16b, 16c is controlled to connect each of the buffers 17a, 17b, 17c to each of the areas 15a, 15b, 15c of the system bus interface 15.

Each one byte of the four-byte data D0 in order from the highest-order side is sequentially inputted to each of the areas 15a, 15b, 15c, 15d of the system bus interface 15 and is further sent via each of the selectors 16a, 16b, 16c or directly to each of the buffers 17a, 17b, 17c, 17d. At that time, when the control signal generating unit 18 simultaneously makes each of the latch signals LC1 through LC4 significant, each one byte of the four-byte data is buffered in each buffer 17a, 17b, 17c, 17d. And, when the control signal generating unit 18 controls the sending control signal SC1 through SC4 to be at the side of the internal data bus 13, such data of all-the-four effective bytes being inputted from the system bus 6 to the system bus interface 15 as shown in FIG. 10 are outputted intact to the internal data bus 13.

Data Split Operation

Data split here means the operation to split one piece of four-byte data whose all the bytes are effective into four pieces of one byte data.

Now will be referred to the case where the bus width control signal WC assigns one byte as the effective data bus width of the system bus 6. Meanwhile, as mentioned above, in this case, each of the selectors 16a, 16b, 16c is controlled in response to the bus width control signal WC so as to connect all the buffers 17a, 17b, 17c to the area 15d of the system bus interface 15.

It is assumed that the four-byte data D0 which consists of each of one effective byte EB1 through EB4 shown in FIG. 9 is outputted onto the internal data bus 13. And when the control signal generating unit 18 simultaneously makes all the latch signals LC1 through LC4 significant, each effective byte EB1 through EB4 of this four-byte data D0 is simultaneously buffered sequentially in order from the high-order side in each buffer 17a, 17b, 17c, 17d. When the control signal generating unit 18 makes the sending control signal SC1 to be the side of the selector 16a first, one effective byte EB1 out of the effective bytes EB1 through EB4 being buffered by the buffer 17a, 17b, 17c, 17d is sent from the buffer 17a to the selector 16a.

At that time, since the bus width control signal WC assigns the effective data bus width at one byte, the selector 16a is connected not to the area 15a being at the highest-order side of the system bus interface 15 but to the area 15d being at the lowest-order side thereof. As a result, the effective byte EB1 being buffered by the buffer 17a is sent via the selector 16a to the area 15d being at the lowest-order side of the system bus interface 15. As a result, the effective byte EB1 of the four-byte data D0 shown in FIG. 9 becomes the one byte being at the lowest-order side of the four-byte data D1 shown in FIG. 8 and is sent to the system bus 6.

As in the same way, when the control signal generating unit 18 controls the sending control signals SC2 through SC4 sequentially to be at, the side of the system bus interface 15, each of the effective bytes EB2, EB3, EB4 of four-byte data D0 being buffered in each buffer 17b, 17c, 17d is sent via each selector 16b, 16c or directly to the area 15d being at the lowest-order side of the system bus interface 15. As a result, as shown in FIG. 8, four-byte data D2 through D4 each of which contains the effective byte EB2, EB3, EB4 in each one byte being at the lowest-order side thereof are sent to the system bus 6.

Incidentally, in the case where the bus width control signal WC assigns four bytes as the effective data bus width of the system bus 6, the four-byte data D0 consisting of all the effective bytes being outputted onto the internal data bus 13 as shown in FIG. 10 is buffered by each buffer 17a, 17b, 17c, 17d as in the same way as the above case. And the control signal generating unit 18 simultaneously controls the sending control signals SC1 through SC4 to be at the side of the system bus interface 15. In that case, since each selector 16a, 16b, 16c is controlled in response to the bus width control signal WC so as to select each corresponding area 15a, 15b, 15c of the system bus interface 15, each one-byte data being buffered by each buffer 17a, 17b, 17c, 17d is simultaneously sent to each area 15a, 15b, 15c, 15d of the system bus interface 15 and these are sent to the system bus 6 as one piece of four-byte data. As a result, the four-byte data being sent on the internal data bus 13 is sent intact to the system bus 6.

Now will be described below operation of the cache memory of the present invention wherein such a bus width control circuit of the invention as described above is installed.

Read Access Operation (1) "In the case where there is stored no data to be accessed to read in the cache memory 1"

In the case where the data to be accessed to read is not stored in the cache memory 1, the cache memory 1 accesses toward the side of the system bus 6 and allows such a peripheral device as the main memory to output said data to the system bus 6.

Bit images of said data being on the system bus 6 in the case where the width of the data being outputted to the system bus 6 is set at one byte are as shown in FIG. 8. And such data are sequentially fetched from the system bus interface 15 into the cache memory 1, and these four pieces of data are connected to be one data, being sent as such a four-byte data D0 as shown in FIG. 9 to the internal data bus 13.

While, bit images of said data being on the system bus 6 in the case where the width of the data being outputted to the system bus 6 is set at four bytes are as shown in FIG. 10. And the data are sent intact to the internal data bus 13.

The MPU bus interface 11 further sends the data being sent to the internal data bus 13 by either of the above operations to the MPU bus 5 and responds to the read access from the side of the MPU bus 5. At the same time, if said address is within the area of caching address, the data memory unit 12 fetches and holds the data being sent on the internal data bus 13.

(2) "In the case where there is stored the data to be accessed to read in the cache memory 1"

When the MPU bus 5 accesses to read data, the data memory unit 12 sends said data to the internal data bus 13. And the data being sent to the internal data bus 13 is the four-byte data with either of the bit images shown in FIGS. 9 and 10. When this data is sent via the MPU bus interfaces 11 to the MPU bus 5, the MPU bus interface 11 responds to the read access from the side of the MPU bus 5.

Write Access Operation

When the MPU bus 5 accesses to write data, the MPU bus interface 11 fetches said data into the internal data bus 13. The bit image of the data being on the internal data bus 13 is shown as either in FIG. 9 or FIG. 10.

In the case where the output data width being assigned in response to the bus width control signal WC is one byte, the data split operation is provided for said data by the bus width control circuit 14 in order to split it into the data with such bit images as shown in FIG. 8, being sent to the system bus interface 15.

In that case, the data to be outputted to the system bus interface 15 is buffered by each buffer 17a, 17b, 17c, 17d first, and then, if the read access by the MPU being connected to the side of the internal data bus 13 hits the cache memory 1 while each one-byte data being buffered in each buffer 17a, 17b, 17c, 17d is sequentially being outputted to the system bus interface 15, the MPU can continue its operation. In other words, as shown in a schematic view of FIG. 11, the MPU completes its write access at the n-th cycle when it buffers said data in each buffer 17a, 17b, 17c, 17d. And each of the effective bytes EB1 through EB4 comprising the four-byte data is sequentially accessed to write from the system bus interface 15 during four cycles, i.e., from the n-th through the n+3-th cycles. As a result, during three cycles, i.e., from the n+1-th through n+3th cycles, the processing capable of being executed between the MPU and cache memory 1 alone, i.e., the read access by the MPU in the case where it hits the cache memory 1 can be carried out.

In the case where the output data width being assigned in response to the bus width control signal WC is four bytes, neither split nor connection is provided for said data by the bus width control circuit 14, and said data is sent intact to the system bus interface 15.

The system bus interface 15 outputs the data being sent by either of the above operations to the system bus 6, carrying out the write access. At the same time, if data corresponding to an address of said data is already held in the data memory unit 12, the data memory unit 12 fetches and updates said data.

Operations of the cache memory 1 when the MPU bus 5 accesses to read and write data are as mentioned above. Since the effective bus width of the cache memory 1 being at the side of the system bus 6 is set by the bus width control circuit 14 and is not dependent on the data bus width of the MPU bus 5, the cache memory is effectively and readily connected to various kinds of peripheral devices with different data widths from that of the MPU.

As mentioned above in detail, according to the present invention, in the case where the cache memory is connected to such a peripheral device as the main memory with the different effective data bus width from that of the MPU, control to convert the effective data bus width of the cache memory into both directions can readily be carried out, then, degree of freedom in the system construction of data processor is largely improved.

Furthermore, in the construction of the cache memory wherein the bus width control circuit of the invention is installed, in the case where the bus width of the peripheral devices is narrower than that of the cache memory being at the side of the MPU, it is possible to reduce a stand-by time of the side of the MPU when the MPU accesses to write data. In other words, when outputting data while reducing the bus width from the side where the bus width of the bus width control circuit of the invention is fixed toward the side where the bus width is variable, it becomes possible to execute the processing being capable only at the side where the bus width is fixed even though outputting of all the data is not finished yet.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A cache memory in an environment of a computing device which includes a microprocessor; a first bus of n-bits width for coupling the microprocessor to the cache memory; one or more peripheral devices including a main memory and a second bus of n-bits width for coupling said one or more peripheral devices to said cache memory; wherein said caches memory stores a portion of storage content of said main memory thereon; said cache memory being provided with a bus width control circuit comprising:

a buffer group which consist of a plurality of buffers for buffering each portion of data being obtained by splitting n-bits data into partial data of m-bits and which are connected to said first bus in parallel;

a selector which switches between a first configuration to connect said each buffer to said second bus in parallel and a second configuration to connect said each buffer to a predetermined m bits of said second bus;

a selector control means for connecting said each buffer to said predetermined m bits of said second bus in a first case where said second bus is being used for transferring data having a width of m bits, and for connecting said each buffer to said second bus in parallel in a second case where said second bus is being used for transferring data having a width of n bits; and control means for, in said first case, simultaneously outputting contents of said plurality of buffers to said first bus after sequentially buffering a plurality of data from said second bus into said buffer group, and sequentially outputting contents of said plurality of buffers to said second bus after buffering one data from said first bus to said each buffer, and in said second case, simultaneously outputting contents of said plurality of buffers to said first bus after buffering one data from said second bus into said buffer group, and simultaneously outputting contents of said plurality of buffers to said second bus after buffering one data from said first bus into said each buffer.

2. The bus width control circuit as set forth in claim 1, wherein said second bus includes means for cache memory wherein said transmitting a first bit-group which includes a low-order bit and means for transmitting a second bit-group which includes a high-order bit and wherein said first bit group is included in said predetermined m bits.

3. A cache memory in an environment of a computing device which includes a microprocessor; a first bus of n-bits width for coupling the microprocessor to the cache memory; one or more peripheral devices including a main memory and a second bus of n-bits width for coupling said one or more peripheral devices to said cache memory; wherein said cache memory stores a portion of storage content of said main memory therein; said cache memory being provided with a bus width control circuit comprising:

a buffer group which consist of a plurality of buffers for buffering each portion of data being obtained by splitting each portion of data being obtained by splitting n-bits data into partial data of m-bits and which are connected to said first bus in parallel;

a selector which switches between a first configuration to connect said each buffer to said second bus in parallel and a second configuration to connect said each buffer to a predetermined m bits of said second bus;

a selector control signal generating means for generating a first selector control signal which controls said selector to connect said each buffer to said predetermined m bits of said second bus, and a second selector control signal which controls said selector to connect said each buffer to said second bus in parallel; and control means for generating a first buffer group control signal to sequentially buffer a plurality of data into said buffer group, a second buffer group control signal to buffer one data into said each buffer, a first data sending control signal which simultaneously outputs data being buffered in said buffer group, and a second data sending control signal which sequentially outputs the one data being buffered in said buffer group, wherein, in a first case where said second bus is being used for transmission of data with a width of m bits, said selector control signal generating means generates said first selector control signal and said control means outputs said first data sending control signal after outputting said first buffer group control signal, and then, a plurality of m-bits data are outputted from said second bus to said first bus as one n-bits data and one n-bits data is sequentially outputted from said first bus to said second bus as said plurality of m-bits data, and in a second case where said second bus is being used for transmission of data with a width of n bits, said selector control signal generating means generates said second selector control signal and said control means outputs said second data sending control signal after outputting said second buffer group control signal, and then, one n-bits data is outputted from said second bus to said first bus as one n-bits data and one n-bits data is outputted from said first bus to said second bus as one n-bits data.

4. The bus width control circuit as set forth in claim 3, wherein said second bus includes means for cache memory wherein said transmitting a first bit-group which includes a low-order bit and means for transmitting a second bit-group which includes a high-order bit and wherein said first bit group is included in said predetermined m bits.

* * * * *